United States Patent
Sato (10) Patent No.: US 7,831,385 B2
(45) Date of Patent: Nov. 9, 2010

(54) ROUTE GUIDANCE PROVIDING SYSTEM, IMAGE FORMING APPARATUS, AND IMAGE FORMING METHOD

(75) Inventor: Masaaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1092 days.

(21) Appl. No.: 11/531,382

(22) Filed: Sep. 13, 2006

(65) Prior Publication Data

US 2007/0067102 A1    Mar. 22, 2007

(30) Foreign Application Priority Data

Sep. 16, 2005 (JP) .............................. 2005-270408

(51) Int. Cl.
*G06F 17/00* (2006.01)
(52) U.S. Cl. ........................... 701/209; 348/113
(58) Field of Classification Search ................ 701/209, 701/201, 206, 211, 213, 214, 205; 340/995.12, 340/995.19, 995.1, 995.29; 348/113, 116, 348/118, 119, 142
See application file for complete search history.

(56) References Cited

U.S. PATENT DOCUMENTS

2003/0037287 A1 * 2/2003 Nakamura et al. ............ 714/30
2005/0144049 A1 * 6/2005 Kuzunuki et al. ............... 705/6
2005/0219403 A1 * 10/2005 Hyodo ........................ 348/349

FOREIGN PATENT DOCUMENTS

JP    2003-139552    5/2003

* cited by examiner

*Primary Examiner*—Dalena Tran
(74) *Attorney, Agent, or Firm*—Cowan, Liebowitz & Latman, P.C.

(57) ABSTRACT

In offering a route guidance service at a plurality of sites, passage through the same route as before is excluded from the route guidance as much as possible. In order to achieve this object, a route guidance providing system according to this invention includes a plurality of image forming apparatuses connected to a server through a network and provides route guidance to a user. The system includes a unit which acquires, on the basis of, history information until the user travels to the installation location of the image forming apparatus, a unit which acquires, on the basis of the document, destination information of the user, a unit which acquires additional destination information, and a search unit which finds route guidance on the basis of the destination information, additional destination information, and history information. The found route guidance is printed.

6 Claims, 11 Drawing Sheets

ROUTE GUIDANCE PROVIDING SYSTEM, IMAGE FORMING APPARATUS, AND IMAGE FORMING METHOD

BACKGROUND OF THE INVENTION

1. Field of the Invention

The present invention relates to an information processing technique for providing information about a route through a network such as the Internet.

2. Description of the Related Art

Conventionally, navigation systems are well-known as a means for providing information (route guidance) about a route from a current point to a plurality of predetermined destinations or way points (to be referred to as destinations hereinafter).

As a characteristic feature, a navigation system can flexibly change the destination. To take advantage of this characteristic feature, the user interface of a normal navigation system is designed to change and re-find the destination in accordance with the same procedures used in a prior route search. That is, the user interface is designed to receive route guidance following a setting change from the current point to a newly changed destination (e.g., Japanese Patent Laid-Open No. 2003-139552).

An operation example will be described, in which route search is executed by first setting the destination to BBB, and receiving route guidance. Then, en route to the destination (BBB), destination AAA is added, and still another destination CCC is also added. To re-execute the search in this situation using the navigation system, the user performs the following operations.

(1) Set a route, current point No. 1→AAA→BBB and re-execute search.

(2-1) Destination CCC is added before visiting destination AAA

Set a route, current point No. 2→AAA→CCC→BBB again and re-execute search.

(2-2) Destination CCC is added after visiting destination AAA

Clear setting (1), set a route, current point No. 3→CCC→BBB again, and re-execute search.

By re-executing the search according to the above procedures, the user can receive route guidance after a change.

One example application of such route guidance by a navigation system is route guidance by Internet service through a Web browser. For example, travel agencies can provide an Internet service to offer geographic information to tourists using route guidance through a Web browser. The travel agencies can also provide this Internet service as part of a travel service.

If a travel agency provides this service, a user can easily acquire geographic information as route guidance from the current location of the travel agency to the destination by going to the travel agency and requesting route search to receive route guidance to the destination.

However, conventional navigation systems are designed to re-execute route search including information regarding locations already visited. Hence, in some cases, the user must go to a predetermined destination through the same route. For example, the search re-execution in case (2) is not performed in consideration destination AAA, which was already visited. Instead, a route to minimize the distance to destination CCC is provided. For this reason, route guidance with the same route as one already traversed may be provided.

In particular, a user who wants the above-described route guidance service of a travel agency must go to the agency to obtain the service. From there, with high probability, the user can take the same route.

However, it would be preferable for a user. (i.e., a tourist) to not waste time visiting an unknown place by traveling via the same route. In such a case, preferably route guidance should, as much as possible, exclude passage through the same route.

Normally, each area has only one travel agency. Thus, to obtain route guidance to a destination, the user inevitably goes to the same place. In consideration of this fact, not only a specific travel agency but also a plurality of sites (e.g., convenience stores) would preferably offer the service to provide geographic information as route guidance.

SUMMARY OF THE INVENTION

The present invention has been made in consideration of the above problems, and has as its object to cause a system capable of implementing a route guidance providing service at a plurality of sites to provide route guidance while excluding passage through the same route as before as much as possible.

In order to achieve the above object, a route guidance providing system according to the present invention has the following arrangement. That is, a route guidance providing system which includes a plurality of image forming apparatuses each connected to a server through a network and each including a reading unit configured to read a document and a printing unit configured to print image data and provides information about a route to a user of the image forming apparatus, comprising:

a first acquisition unit configured to acquire, on the basis of the document read by the reading unit, history information representing a travel history until a user of one of the image forming apparatuses travels to an installation location of the image forming apparatus;

a second acquisition unit configured to acquire, on the basis of the document read by the reading unit, destination information about a destination of the user of one of the image forming apparatuses;

a third acquisition unit configured to acquire additional destination information about a destination which is newly input by the user of one of the image forming apparatuses; and a search unit configured to find information about the route on the basis of the destination information, the additional destination information, and the history information, wherein the printing unit prints the information about the route found by the search unit.

According to the present invention, a system capable of implementing route guidance providing service at a plurality of sites can provide route guidance while, as much as possible, excluding passage through the same route as before.

Further features of the present invention will become apparent from the following description of exemplary embodiments with reference to the attached drawings.

DESCRIPTION OF THE EMBODIMENTS

The embodiments of the present invention will be described below in detail with reference to the accompanying drawings.

First Embodiment

1. Configuration of Route Guidance Providing System

Figure 1:
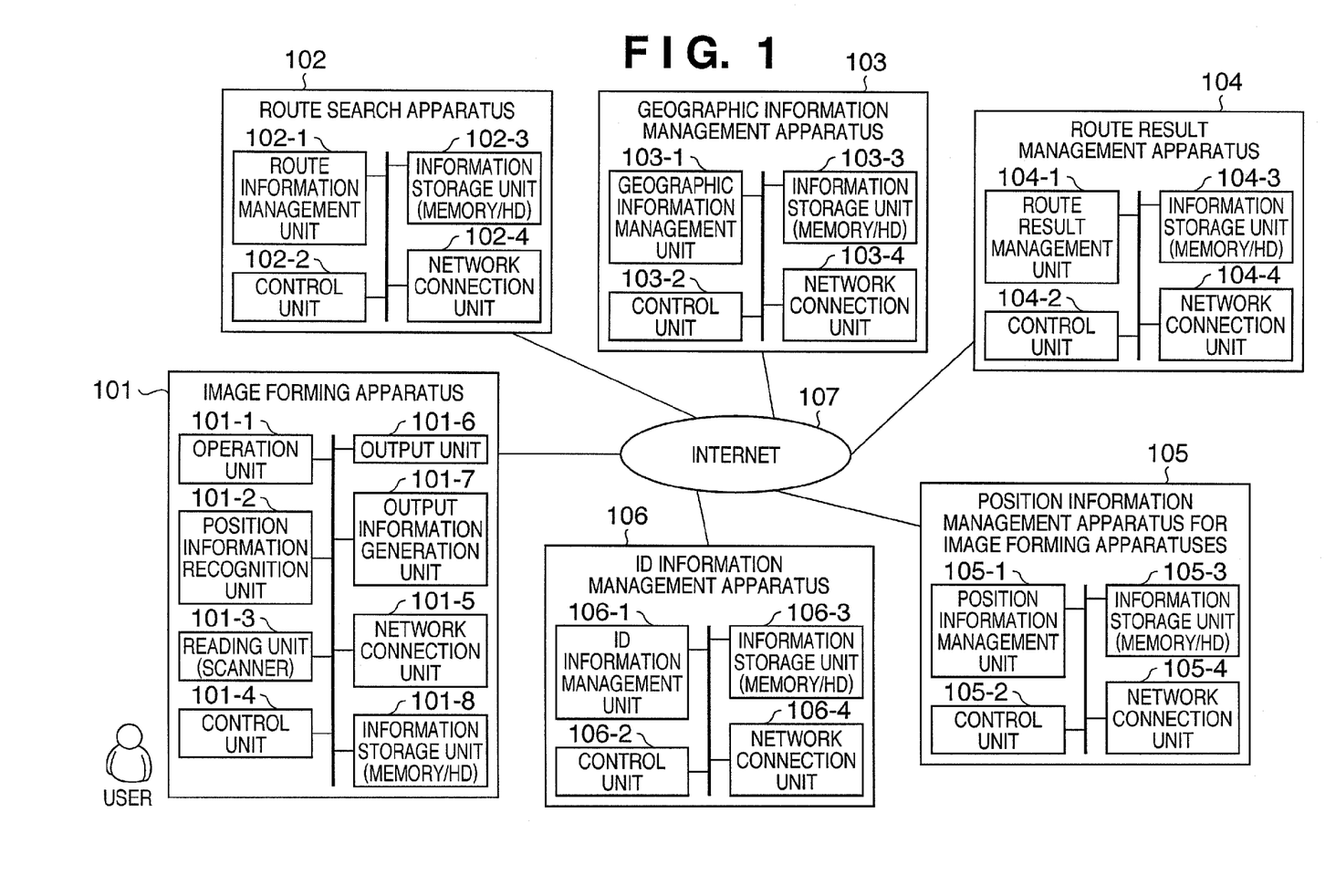
FIG. 1 is a view showing the configuration of a route guidance providing system according to an embodiment of the present invention.

FIG. 1 is a view showing the configuration of a route guidance providing system according to the first embodiment of the present invention. As shown in FIG. 1, the route guidance providing system comprises an image forming apparatus 101, route search apparatus 102, geographic information management apparatus 103, route result management apparatus 104, position information management apparatus 105 for the image forming apparatuses, and ID information management apparatus 106. The apparatuses are connected through the Internet 107.

However, the present invention is not particularly limited to the internet. Any other network system such as a LAN (Local Area Network) may be used.

The image forming apparatus 101 provides an interface for user operation. A plurality of image forming apparatuses 101(1), 101(2), ..., 101(N) having the same arrangement as the image forming apparatus 101 are connected through the Internet 107. The image forming apparatuses are designed to receive a request from a user and offer a service of route guidance (geographic information and information about a route search result). The user can obtain the service from multiple locations. For the descriptive convenience, the image forming apparatuses will be referred to as image forming apparatuses 101 hereinafter.

The image forming apparatus 101 has various functions such as a print function and a reading function (scanner). The present embodiment uses an MFP, i.e., a multi-function printer. The image forming apparatus 101 has a function of recognizing its position information (information about the position where the image forming apparatus is installed). A purpose of the function is to provide current point information serving as a start point with respect to a destination set by a user. Another purpose of the function is to print the location of the image forming apparatus in printed geographic information.

Each of the route search apparatus 102, geographic information management apparatus 103, route result management apparatus 104, position information management apparatus 105 for the image forming apparatuses, and ID information management apparatus 106 may act as a server. In short, these apparatuses receive a processing request from the image forming apparatus 101 and return a processing result corresponding to the processing request to the image forming apparatus 101. Each of the apparatuses include an information processing apparatus (computer) comprised of a CPU, ROM, RAM, and HDD as well as providing a server function by, e.g., a Web service, as will be described later.

2. Functions Provided by Apparatuses 102 to 106

The route search apparatus 102 finds a route to a designated destination and also finds a route to a destination while skipping a designated destination. The geographic information management apparatus 103 provides geographic information that indicates the positional relationship between a designated destination and a nearest point (e.g., a station or bus stop). The route result management apparatus 104 provides a function for storing or extracting information about a predetermined route search result. The position information management apparatus 105 for the image forming apparatuses manages position information for multiple image forming apparatuses 101 connected to the Internet 107 and provides information representing the location of each image forming apparatus 101. The ID information management apparatus 106 has a function of issuing a unique ID and provides a unique key value to be used to search for information about a route search result stored in the route result management apparatus 104.

3. Functional Arrangements of Apparatuses 101 to 106

3.1 Image Forming Apparatus 101

The image forming apparatus 101 is comprised of an operation unit 101-1, position information recognition unit 101-2, reading unit (scanner) 101-3, control unit 101-4, network connection unit 101-5, output unit 101-6, output information generation unit 101-7, and an information storage unit (memory/HD) 101-8.

The operation unit 101-1 includes a touch panel and key buttons which are used for input and display of data. The user can select a service and instruct scan or printing through a displayed menu. In short, the operation unit 101-1 provides a user interface for the user to execute actual operation.

The position information recognition unit 101-2 controls the operation of, e.g., a GPS (Global Positioning System). Recognized current position information is transmitted to the position information management apparatus 105 for the image forming apparatuses and unitarily managed by a position information management unit 105-1 of the position information management apparatus 105 for the image forming apparatuses. The current position information is used as current point information to display the start point to a destination.

The reading unit (scanner) 101-3 controls the operation of the scanner. Electronic data is read through the scanner is transmitted or copied.

The control unit 101-4 manages various kinds of services in the image forming apparatus 101 and modes such as print and scan and controls route search processing. The control unit 101-4 also controls processing of the control units such as the operation unit 101-1, position information recognition unit 101-2, reading unit (scanner) 101-3, network connection unit 101-5, output unit 101-6, output information generation unit 101-7, and information storage unit (memory/HD) 101-8.

The network connection unit 101-5 controls communication executed through the Internet, LAN, or wireless LAN.

The output unit 101-6 controls the print operation. Information (output information) instructed to output is converted into information for output and printed.

The output information generation unit 101-7 provides a function for acquiring geographic information on the basis of a route search result and shaping it to geographic information for route guidance.

The information storage unit (memory/HD) 101-8 is a database to store necessary information.

3.2 Route Search Apparatus 102

The route search apparatus 102 is comprised of a route information management unit 102-1, control unit 102-2 information storage unit (memory/HD) 102-3, and network connection unit 102-4.

The route information management unit 102-1 finds a route to a designated destination and also finds a route to a destination while skipping the designated destination. The control unit 102-2 controls the route search function of the route search apparatus 102 and processing of the route information management unit 102-1, information storage unit (memory/HD) 102-3, and network connection unit 102-4.

3.3 Geographic Information Management Apparatus 103

The geographic information management apparatus 103 is comprised of a geographic information management unit 103-1, control unit 103-2, information storage unit (memory/HD) 103-3, and network connection unit 103-4.

The geographic information management unit 103-1 provides geographic information that indicates the positional relationship between a designated destination and the nearest station or bus stop. The control unit 103-2 controls the geographic information providing function of the geographic information management apparatus 103 and processing of the geographic information management unit 103-1, information storage unit (memory/HD) 103-3, and network connection unit 103-4.

3.4 Route Result Management Apparatus

The route result management apparatus 104 comprises a route result management unit 104-1, control unit 104-2, information storage unit (memory/HD) 104-3, and network connection unit 104-4.

The route result management unit 104-1 provides a function of storing information about a route search result. The control unit 104-2 controls the route search result information storage function of the route result management apparatus 104 and processing of the route result management unit 104-1, information storage unit (memory/HD) 104-3, and network connection unit 104-4.

3.5 Position Information Management Apparatus 105 for Image Forming Apparatuses The position information management apparatus 105 for the image forming apparatuses is comprised of a position information management unit 105-1, control unit 105-2, information storage unit (memory/HD) 105-3, and network connection unit 105-4.

The position information management unit 105-1 provides a function of recognizing the position information of the image forming apparatus 101 calculated by using, e.g., a GPS (Global Positioning System). The control unit 105-2 controls the function of recognizing the position information of the image forming apparatus 101 in the position information management apparatus 105 and processing of the position information management unit 105-1, information storage unit (memory/HD) 105-3, and network connection unit 105-4.

3.6 ID Information Management Apparatus 106

The ID information management apparatus 106 is comprised of an ID information management unit 106-1, control unit 106-2, information storage unit (memory/HD) 106-3, and network connection unit 106-4.

The ID information management unit 106-1 provides a function of issuing or managing a unique ID value. The control unit 106-2 controls the ID value issue/management function of the ID information management apparatus 106 and processing of the ID information management unit 106-1, information storage unit (memory/HD) 106-3, and network connection unit 106-4.

The control units 102-2, 103-2, 104-2, 105-2, and 106-2 have the same arrangement as the above-described control unit 101-4. More specifically, Each control unit includes an information processing apparatus (computer) comprising a CPU, ROM, RAM, and HDD, as will be described later with reference to FIG. 2.

The information storage units (memories/HDs) 102-3, 103-3, and 104-3 have the same arrangement as the above-described information storage unit (memory/HD) 101-8. The information storage units (memories/HDs) 105-3 and 106-3 also have the same arrangement as the above-described information storage unit (memory/HD) 101-8.

The network connection units 102-4, 103-4, 104-4, 105-4, and 106-4 have the same arrangement as the above-described network connection unit 101-5.

4. Hardware Configuration of Control Unit

Figure 2:
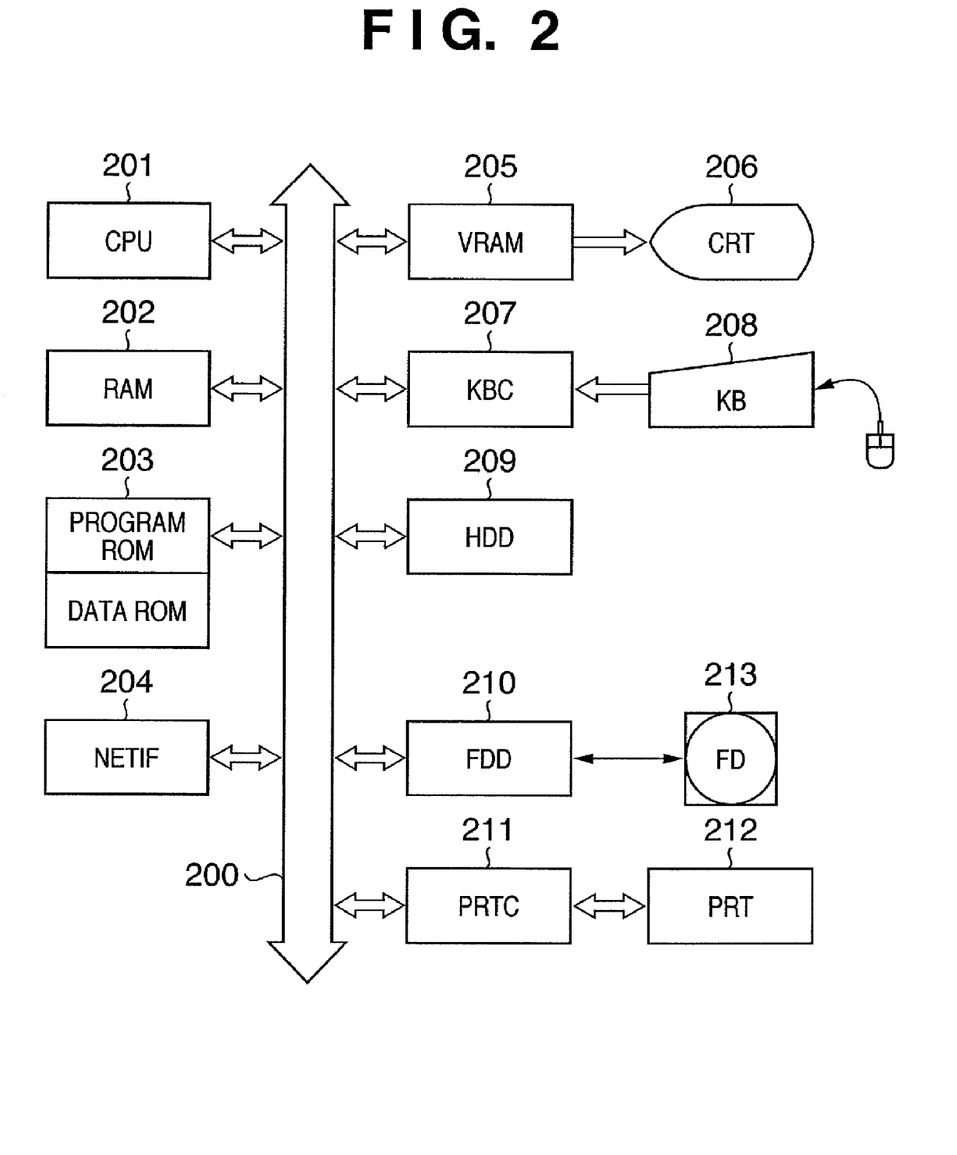
FIG. 2 is a block diagram showing the detailed arrangement of the control unit of each apparatus.

FIG. 2 is a block diagram showing the detailed arrangement of the control units 101-4, 102-2, 103-2, 104-2, 105-2, and 106-2.

Referring to FIG. 2, a central processing unit (to be referred to as a CPU hereinafter) 201 takes charge of operation and control of the information processing apparatus. A random access memory (to be referred to as a RAM hereinafter) 202 functions as the main memory of the CPU 201, the area of an execution program, the execution area of the program, and a data area.

A read-only memory (to be referred to as a ROM hereinafter) 203 stores the operation processing procedures of the CPU 201. The ROM 203 includes a program ROM that records basic software (OS) serving as a system program to control the information processing apparatus and a data ROM that records information necessary for the operation of the system. An HD 209 (to be described later) may be used in place of the ROM 203.

A network interface (NETIF) 204 controls data transfer between information processing apparatuses through a network or diagnoses the connection state. A video RAM (VRAM) 205 bitmaps an image to be displayed on the screen of a CRT 206 to display the operation state of the information processing apparatus and controls display of the image.

The device (to be referred to as a CRT hereinafter) 206 includes a display device. A controller (to be referred to as a KBC hereinafter) 207 controls an input signal from an external input device 208. The external input device (to be referred to as a KB hereinafter) 208 receives a user operation and includes, e.g., a keyboard and a pointing device such as a mouse.

The hard disk drive (to be referred to as an HDD hereinafter) 209 stores application programs and various kinds of data. In these embodiments, the application programs include a software program to execute various kinds of processing functions of the embodiment.

An external input/output device (to be referred to as an FDD hereinafter) 210 such as a floppy® disk drive or CD-ROM drive loads/unloads a removable data recording device (removable medium). For example, the FDD 210 reads out the above-described application programs from a removable medium.

A removable medium 213 such as a magnetic recording medium (e.g., floppy® disk or external hard disk) or optical recording medium (e.g., CD-ROM) is read-accessed by the FDD 210. The removable medium 213 may be a magnetooptical recording medium (e.g., MO) or semiconductor recording medium (e.g., memory card). The application programs and data stored in the HDD 209 may be stored in the FDD 210.

A controller (to be referred to as a PRTC hereinafter) 211 controls the output signal to a PRT 212 (to be described later). The printing device (to be referred to as a PRT hereinafter) 212 uses, e.g., an LBP (Laser Beam Printer). A transmission bus (address bus, data bus, input/output bus, and control bus) 200 connects the above-described units.

5. Service Offered by Route Guidance Providing System

The service offered by the route guidance providing system will be described next. Window images (FIGS. 4, 5, 8, and 9) displayed on the operation unit 101-1 of the image forming apparatus 101 operated by the user will be described first. Printed images (FIGS. 6, 7, and 10) acquired by the user as a result of route search will be described then. These explanations clarify how to offer service to a user in the route guidance providing system (to be referred to as a service offer example hereinafter).

Figure 4:
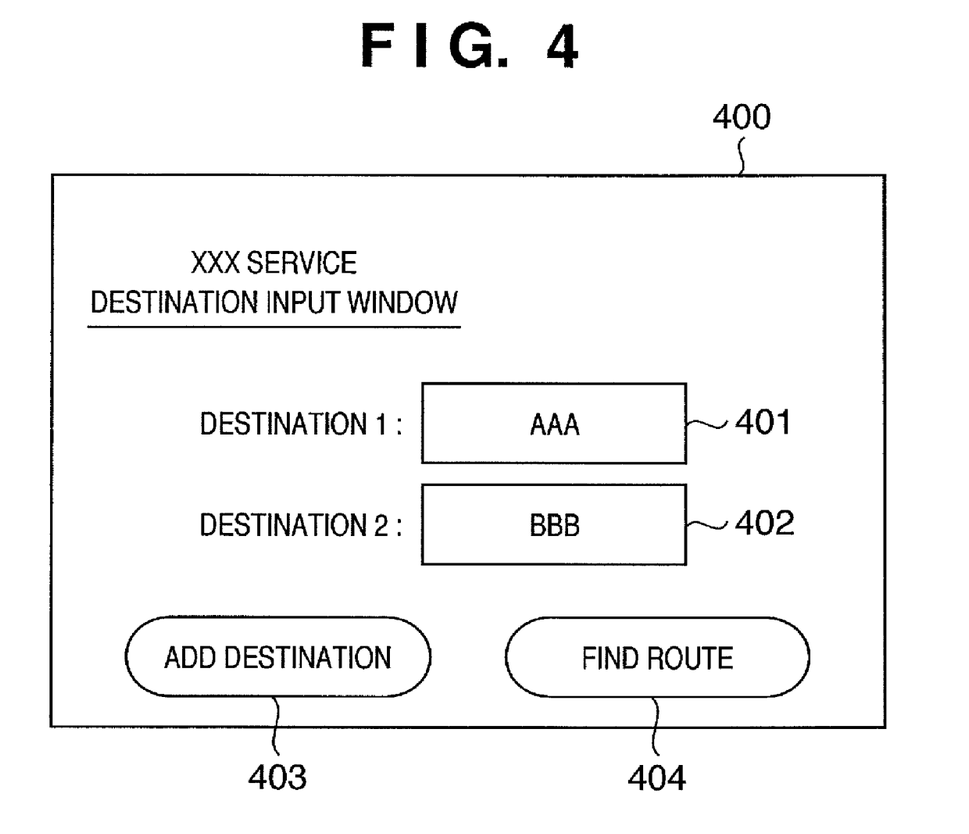
FIG. 4 is a view showing an example of a destination input window.

When a user executes route search for the first time, a destination input window 400 shown in FIG. 4 is displayed on the operation unit 101-1 of the image forming apparatus 101 (image forming apparatus 101(1)) as an example of a window to set a destination. The user inputs, in an input field 401 of "destination 1", a place to be set as a destination. The use can also set additional destinations. The user can input, in an input field 402 of "destination 2", an additional destination by pressing a destination adding button 403. The user requests route search by pressing a route search button 404 (in the example shown in FIG. 4, "AAA" is set as destination 1, and "BBB" is set as destination 2).

Figure 5:
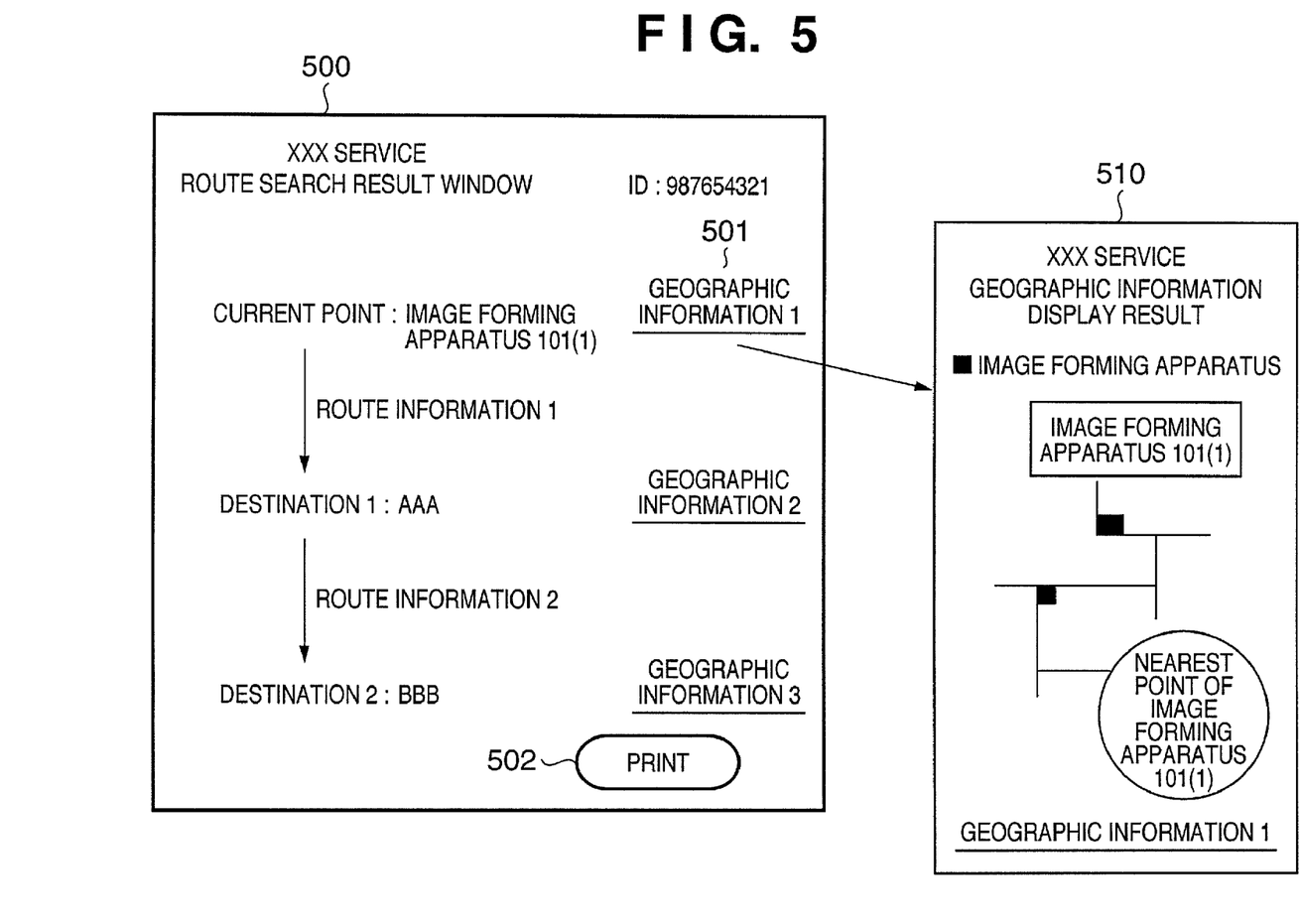
FIG. 5 is a view showing an example of a route search result window.

FIG. 5 shows a route search result window 500 displayed on the operation unit 101-1 of the image forming apparatus 101 as a result of route search. The user can confirm, on the window, geographic information 510 that indicates the positional relationship to a nearest point (e.g., a station or bus stop) by pressing a link 501 of geographic information 1. The user can also print the route search result window 500 and whole corresponding geographic information 510 by pressing a print button 502. If the user should use a means of transportation such as a train or bus, stations and bus stops for transfer and transfer guidance are also printed. A time of arrival and the like are also printed, if possible. The user may designate in starting route search whether to use a means of transportation and what kind of means of transportation should be used.

Figure 6:
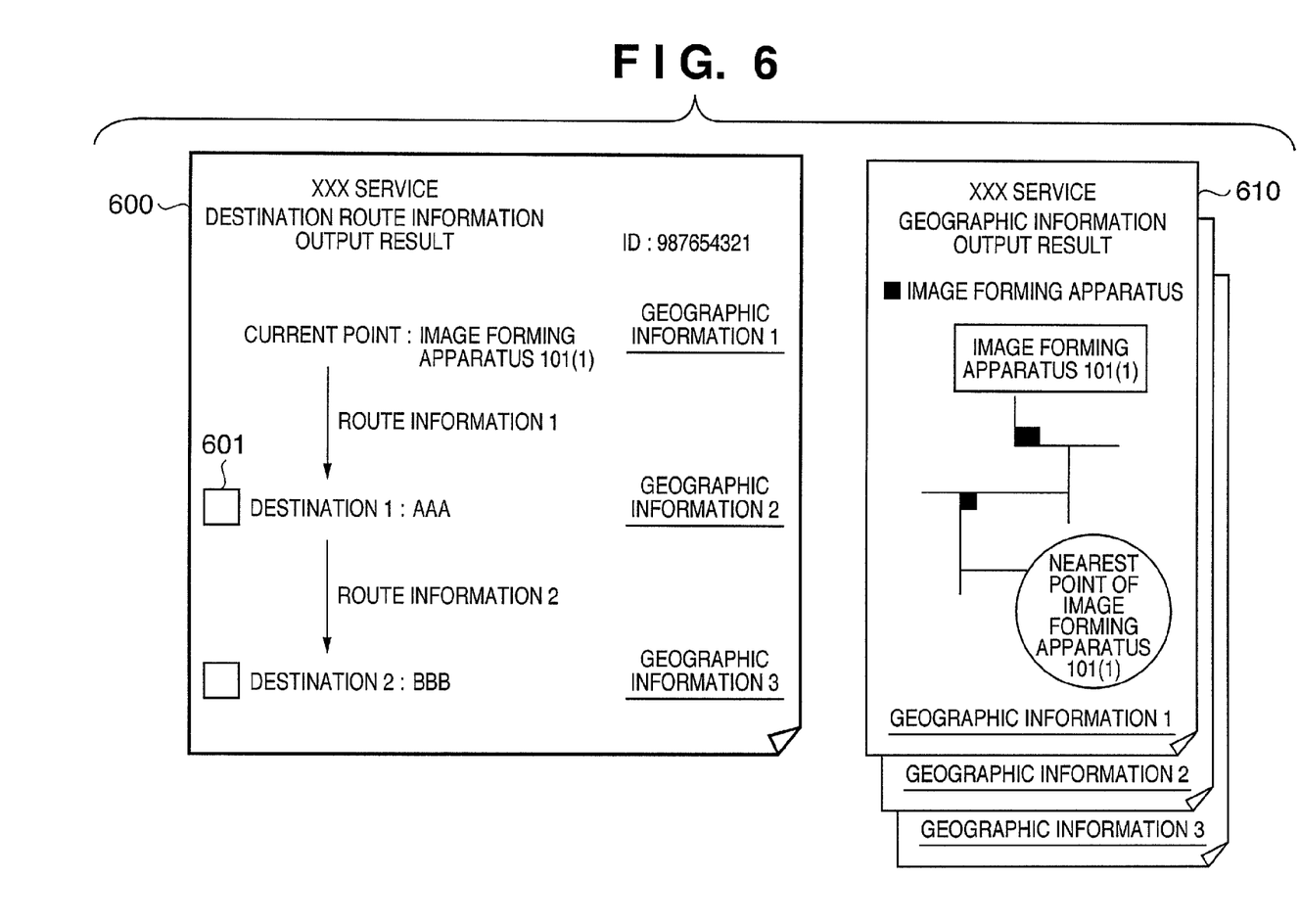
FIG. 6 is a view showing an example of a geographic information output result.

FIG. 6 shows an example of a printed image acquired as a result of user's print instruction. The image contains a destination route information output result 600 and all corresponding geographic information output results 610. A field 601 adjacent to each destination in the destination route information output result 600 is a field to check upon visit of the user. The check contents are used in re-search, which is described later.

Figure 7:
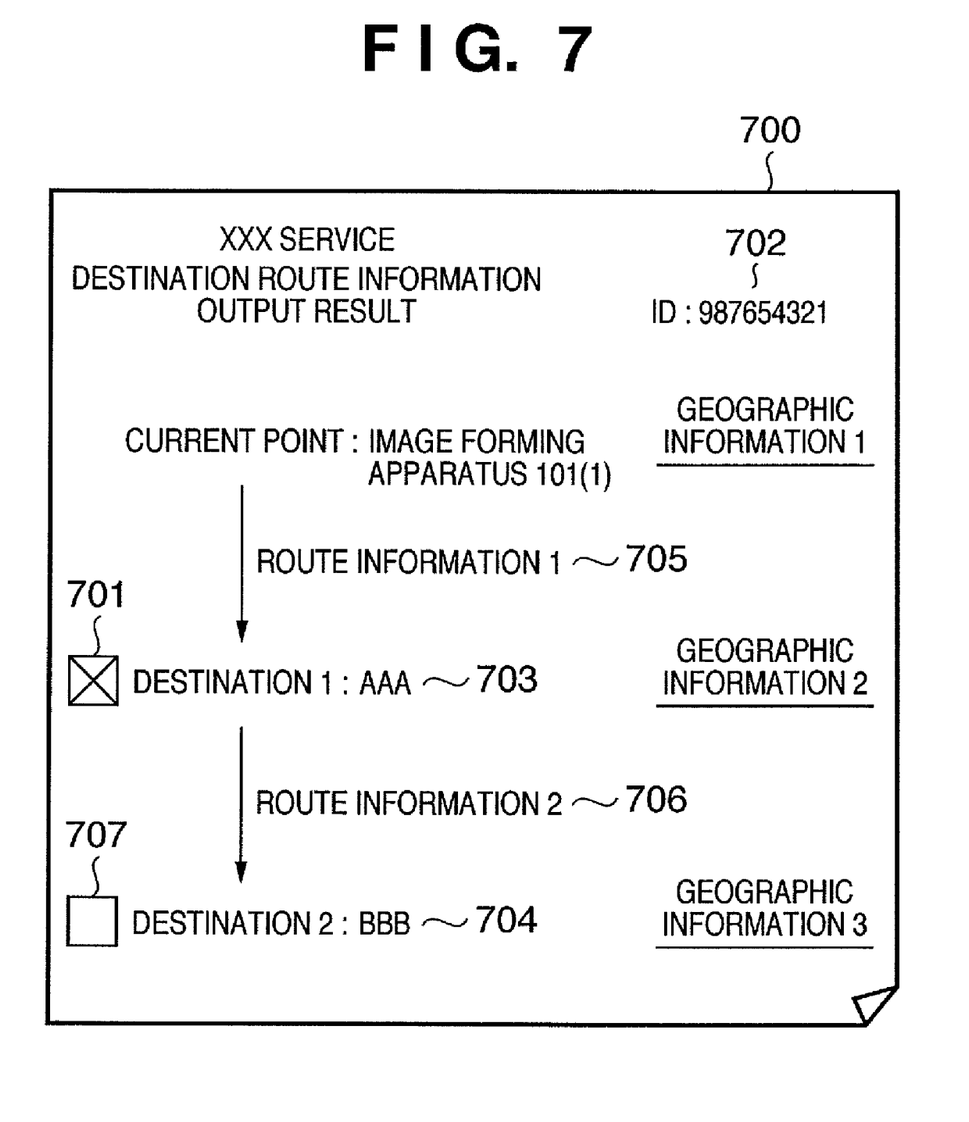
FIG. 7 is a view showing a state wherein a user checks a field adjacent to a destination in the geographic information output result.

Assume that after visiting destination 1 (AAA), the user comes to the installation place of the image forming apparatus 101(2) so as to execute re-search by adding another destination before visiting destination 2 (BBB). At this time, the field 601 adjacent to destination 1 (AAA) in the destination route information output result 600 held by the user has a check mark indicating that he/she has already visited the place. FIG. 7 shows a state wherein the user checks a field 701 adjacent to destination 1 (AAA).

For re-search, the user sets a destination route information output result 700 on the reading unit (scanner) 101-3 of the image forming apparatus 101 (image forming apparatus 101 (2)) at the current point and instructs to scan through the operation unit 101-1.

Figure 8:
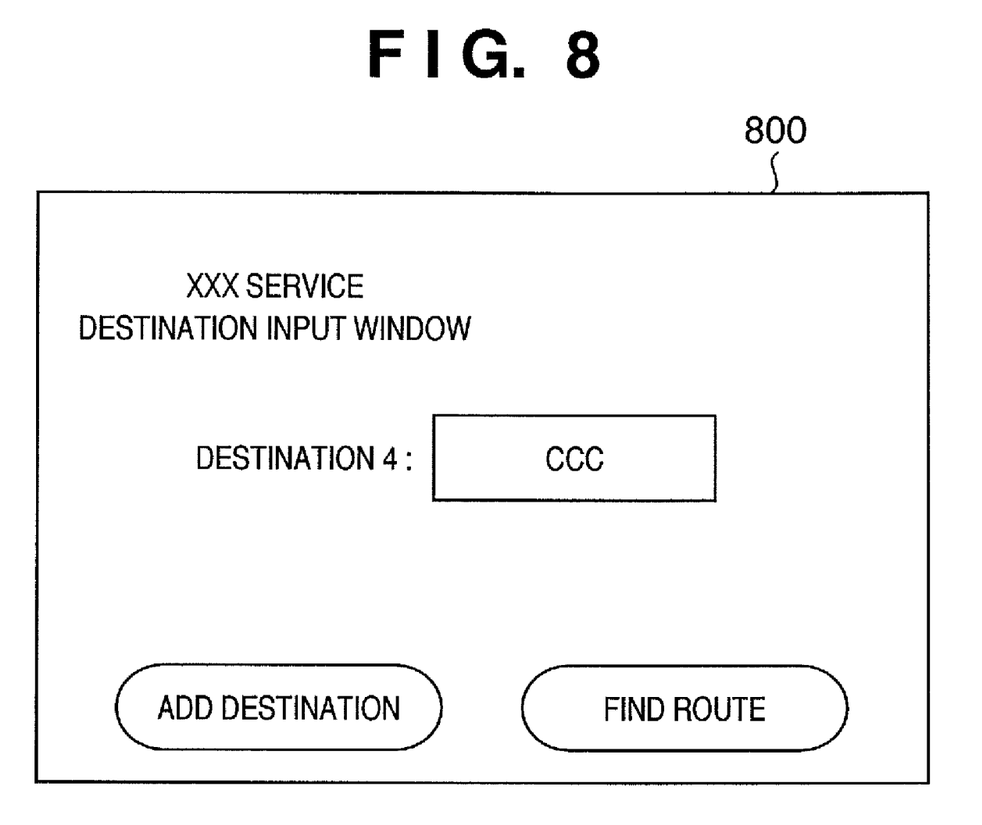
FIG. 8 is a view showing an example of a destination input window in re-search.

The user sets an additional destination by using a destination input window 800 shown in FIG. 8. The operation in this window is the same as in the destination input window 400 shown in FIG. 4, and a description thereof will be omitted (in FIG. 8, "CCC" is set as destination 4).

Figure 9:
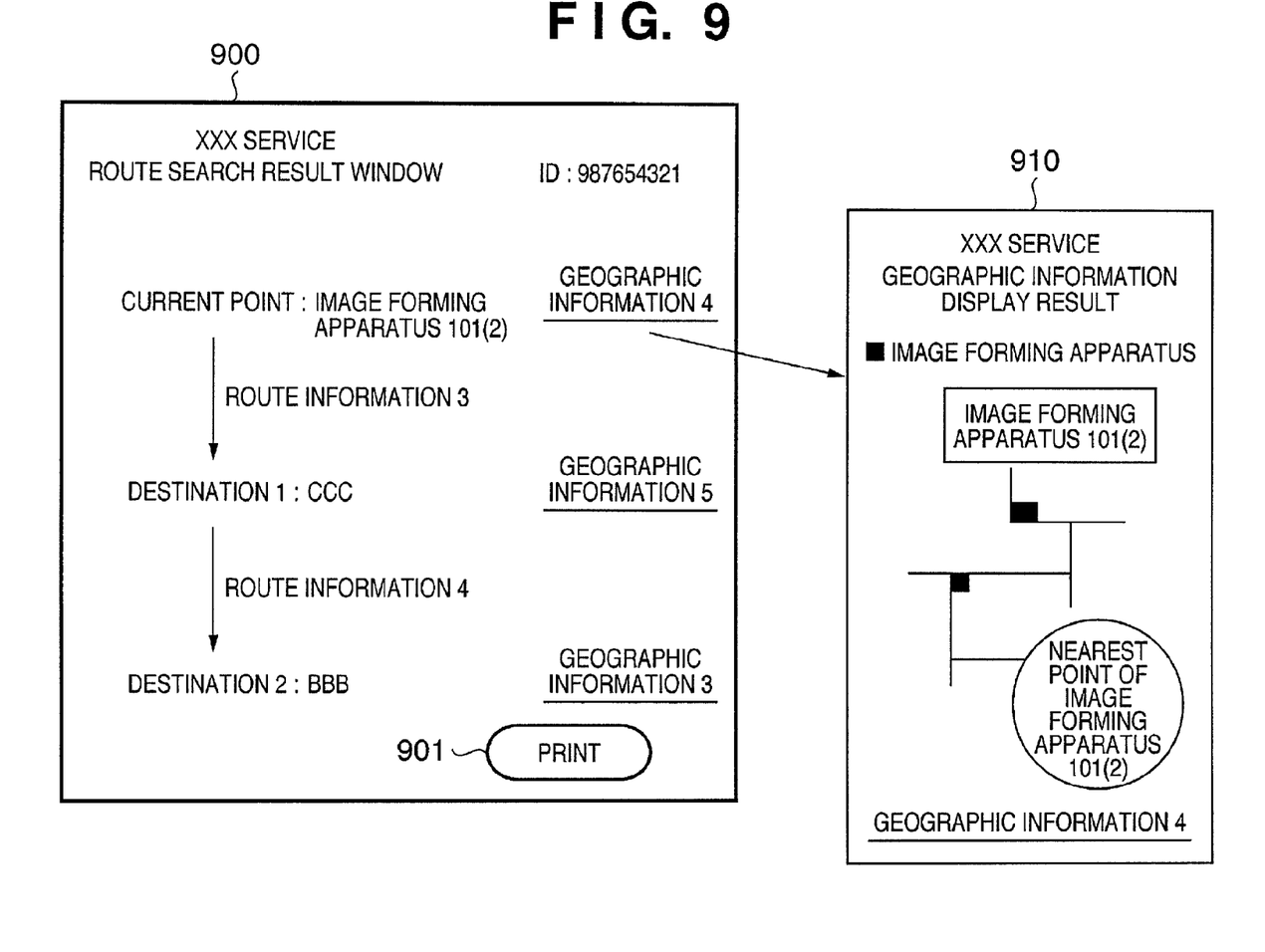
FIG. 9 is a view showing an example of a route search result window displayed in re-search.

FIG. 9 shows an example of a window image displayed on the operation unit 101-1 of the image forming apparatus 101(2) as a result of re-search. The window image shown in FIG. 9 is the same as that in FIG. 5, and a description thereof will be omitted. As a characteristic feature, a route search result window 900 shown in FIG. 9 omits the route to destination 1 (AAA) with a check mark in the field 701 of the destination route information output result 700 that is read in re-search.

Figure 10:
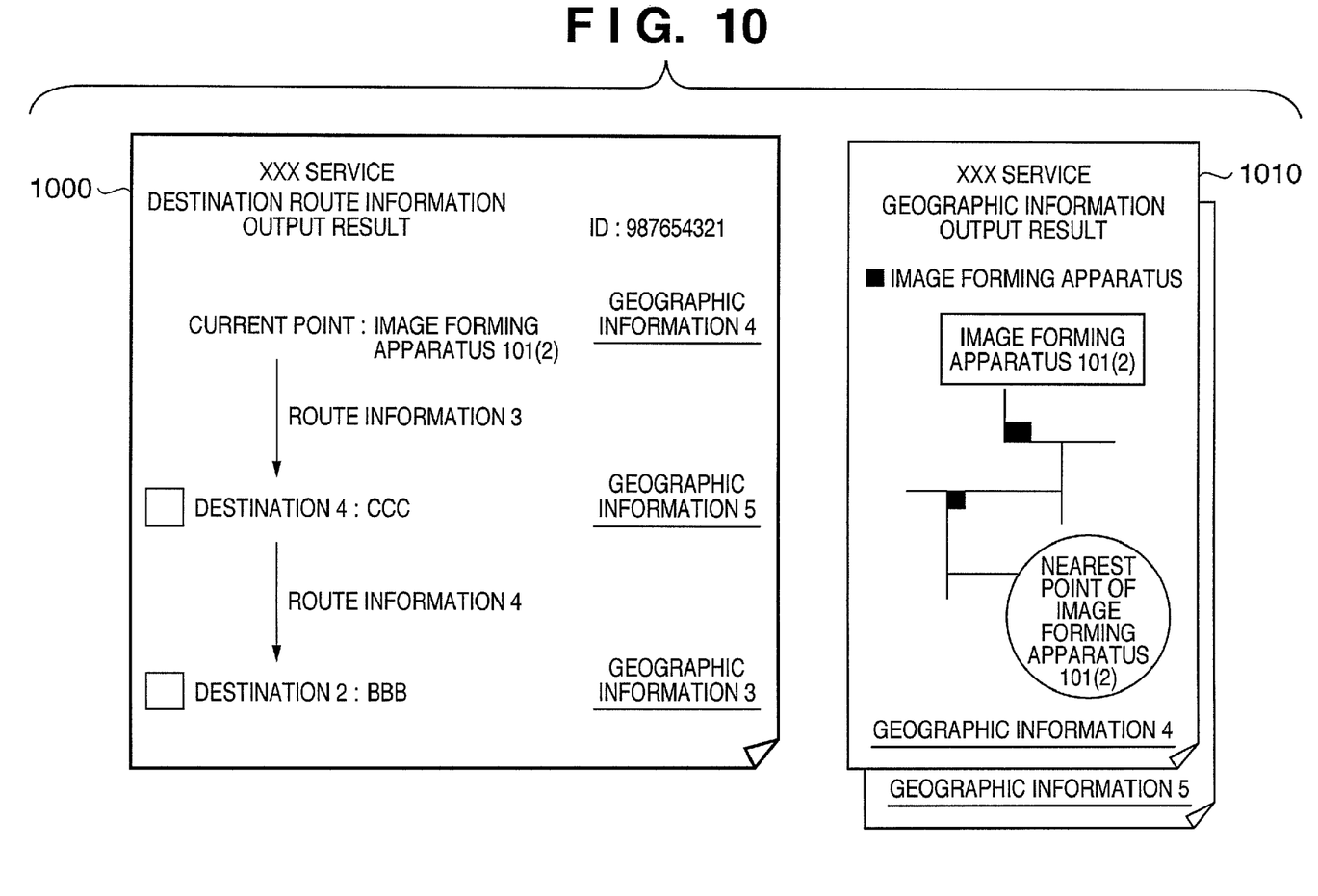
FIG. 10 is a view showing an example of a geographic information output result acquired by re-search.

FIG. 10 shows an example of a printed image acquired when the user presses a print button 901 in the window image in FIG. 9. The printed image shown in FIG. 10 is the same as that in FIG. 6, and a description thereof will be omitted.

The image forming apparatus 101(1) and image forming apparatus 101(2) are located at physically separate places. In route search by each image forming apparatus, its installation point is automatically set as the start point to a destination.

6. Sequence of Processing in Route Guidance Providing System

Figure 3A:
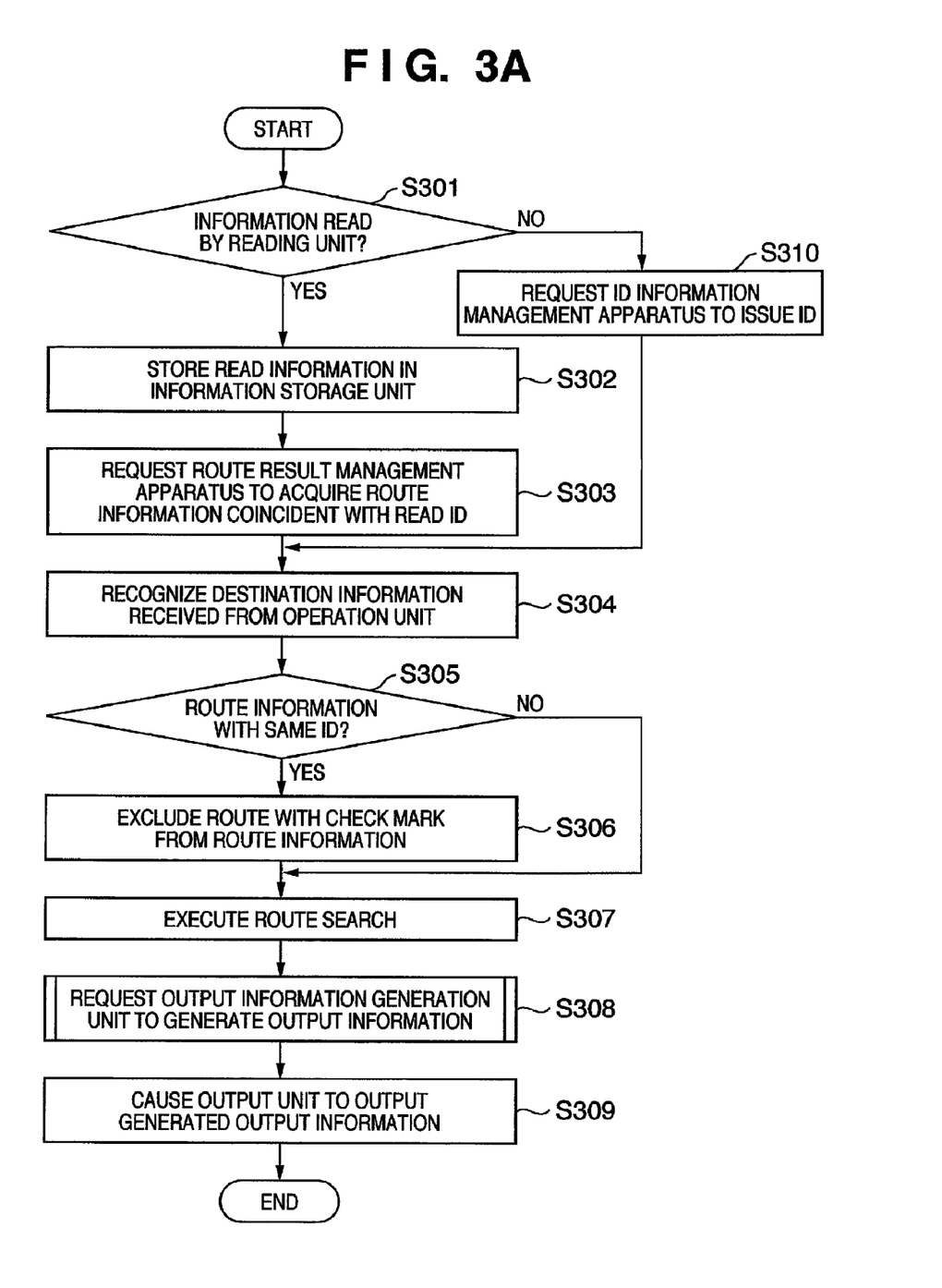
FIGS. 3A and 3B are flowcharts showing the sequence of processing in the route guidance providing system.
Figure 3B:
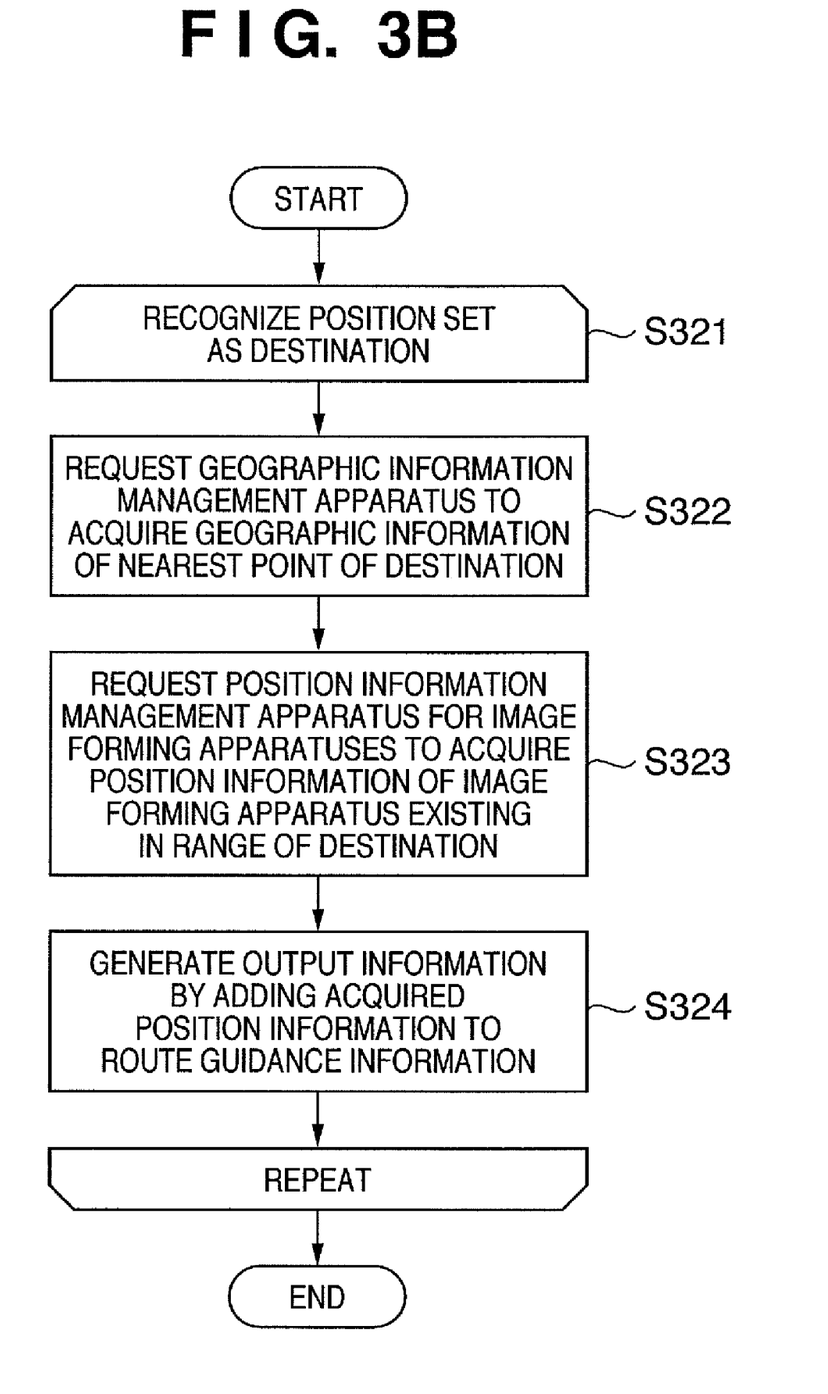

Details of control operation in the route guidance providing system to implement the above-described service offer example will be described next with reference to FIGS. 3A and 3B.

In step S301, the control unit 101-4 determines whether information read by the reading unit (scanner) 101-3 is present. Presence of read information indicates that the user have executed route search to a destination at least once in the past so that the apparatus holds the above-described destination route information output result 700. Reading of information is executed when the control unit 101-4 receives a read instruction signal from the operation unit 101-1 and instructs the reading unit (scanner) 101-3 to read.

In step S302, the control unit 101-4 acquires information read by the reading unit (scanner) 101-3 and stores the read information in the information storage unit (memory/HD) 101-8. Of the information acquired by reading the above-described destination route information output result 700, an ID 702 (unique ID value "987654321" in FIG. 7) and destination information 703 and 704 are stored. The stored information also contains route information 1 705, route information 2 706, and information (history information) representing whether the fields 701 and 707 adjacent to destinations are checked.

In step S310, the control unit 101-4 requests the ID information management apparatus 106 to issue an ID. More specifically, the control unit 101-4 requests, through the network connection unit 101-5, the ID information management apparatus 106 to issue an ID. The ID information management apparatus 106 receives the ID issue request through the network connection unit 106-4. The control unit 106-2 recognizes the request. The ID information management unit 106-1 invokes the ID issue function to issue a new ID. The information storage unit (memory/HD) 106-3 stores the ID. The issued ID is returned (the ID issued here is an ID issued for the first time and has the same value as the ID 702 read by scan in re-search in step S303; hence, the ID will be referred to as the ID 702 hereinafter).

After acquiring the ID 702, the control unit 106-2 returns the issued ID 702 through the network connection unit 106-4 as a response. The control unit 101-4 recognizes the response of the issued ID 702 through the network connection unit 101-5 and holds the acquired ID 702.

In step S303, the control unit 101-4 acquires information having an ID coincident with the ID 702 from information about the past route search result stored in the route result management apparatus 104. In this way, information about the result of route search executed by the user until he/she arrives at the current point is acquired.

More specifically, the control unit 101-4 requests, through the network connection unit 101-5, the route result management apparatus 104 to acquire information about the route search result having an ID coincident with the ID 702. The route result management apparatus 104 receives the acquisition request of the information about the route search result through the network connection unit 104-4. The control unit 104-2 recognizes the request. The search function of acquiring information having an ID coincident with the ID 702, which is provided by the route result management unit 104-1, is invoked to acquire information about the corresponding route search result stored in the information storage unit (memory/HD) 104-3.

The control unit 104-2 returns, as a response, the information about the route search result having the ID coincident with the ID 702 through the network connection unit 104-4. The control unit 101-4 acquires the response of information about the route search result having the ID coincident with the ID 702 through the network connection unit 101-5 and stores the acquired information in the information storage unit (memory/RD) 101-8 in correspondence with the ID 702.

In step S304, the control unit 101-4 recognizes destination information transmitted from the operation unit 101-1 and stores it in the information storage unit (memory/HD) 101-8 in correspondence with the held ID 702.

In step S305, the control unit 101-4 checks whether the information about the route search result having the ID coincident with the held ID 702, exists in the information storage unit (memory/HD) 101-8. More specifically, the control unit 101-4 searches the information storage unit (memory/HD) 101-8 on the basis of the ID coincident with the held ID 702 and acquires all pieces of coincident information.

In step S306, the control unit 101-4 compares the information about the route search result acquired in step S305 and creates search target destination information of the destination except destinations with a check mark in the destination information.

In the above-described service offer example, the destination information stored at the first route search is image forming apparatus 101(1)→AAA→BBB. The destination information set at the re-search is image forming apparatus 101(2)→CCC. These pieces of information are arranged in chronological order to obtain merged route: information image forming apparatus 101(1).→AAA→image forming apparatus 101(2)→CCC →BBB. However, since destination 1 (AAA) is an already visited place with a check mark, the route: information image forming apparatus 101(1).→AAA is determined as unnecessary. Hence, image forming apparatus 101(2)→CCC→BBB is generated as new search target destination information. This makes it possible to provide route guidance excluding places which have been already visited. Hence, the probability to give the guidance of same routes can be reduced.

In step S307, the control unit 101-4 requests the route search apparatus 102 to execute route search about the search target destination information. More specifically, the control unit 101-4 transfers the search target destination information to the route search apparatus 102 through the network connection unit 101-5 and requests route search.

The route search apparatus 102 receives the route search request through the network connection unit 102-4. The control unit 102-2 recognizes the request. The route search function provided by the route information management unit 102-1 is invoked to find a corresponding one of route information stored in the information storage unit (memory/HD) 102-3. When the route information management unit 102-1 acquires a route information search result, the control unit 102-2 recognizes the result and returns the route information through the network connection unit 102-4 as a response. The control unit 101-4 recognizes the response of the route information through the network connection unit 101-5. The control unit 101-4 stores the held ID 702, acquired route information, and destination information in the information storage unit (memory/HD) 101-8 and holds the ID 702.

In step S308, the control unit 101-4 requests the output information generation unit 101-7 to generate output information on the basis of the ID 702 held in step S307. More specifically, the control unit 101-4 transmits the held ID 702 to the output information generation unit 101-7 to request output information generation. The output information generation unit 101-7 acquires information coincident with the received ID 702 from the information storage unit (memory/HD) 101-8. The acquired information includes the route information and destination information stored in step S307.

The process of acquiring geographic information of each destination from the geographic information management apparatus 103 and the process (FIG. 3B) of acquiring, from the position information management apparatus 105 for the image forming apparatuses, the position information of each image forming apparatus 101 in the range to each destination will be described.

Step S312 indicates the start of a loop for each destination information. In this step, all pieces of destination information are invoked (in the example shown in FIG. 10, image forming apparatus 101(2), CCC, and BBB).

In step S322, the output information generation unit 101-7 transmits, to the geographic information management apparatus 103, an acquisition request of the geographic information of a nearest point of the destination specified in step S321. More specifically, the control unit 101-4 receives the acquisition request of the geographic information of a nearest point of the destination from the output information generation unit 101-7 and transmits the geographic information acquisition request to the geographic information management apparatus 103 through the network connection unit 101-5.

The geographic information management apparatus 103 receives the geographic information acquisition request through the network connection unit 103-4. The control unit 103-2 recognizes the request and invokes the map search function provided by the geographic information management unit 103-1. Upon searching for and acquiring corresponding geographic information from the information storage unit (memory/HD) 103-3 managed by the geographic information management unit 103-1, the control unit 103-2 recognizes the search result and acquires the geographic information as the search result.

After acquiring the geographic information as the search result, the control unit 103-2 returns the acquired geographic information through the network connection unit 103-4 as a response. The control unit 101-4 recognizes the response of the acquired geographic information through the network connection unit 101-5 and transmits the response of the geographic information of a nearest point of each destination to the output information generation unit 101-7.

In step S323, the output information generation unit 101-7 transmits, to the position information management apparatus 105 for the image forming apparatuses, an acquisition request of position information of each image forming apparatus that exists in the range to the destination specified in step S321.

More specifically, the control unit 101-4 receives, from the output information generation unit 101-7, the acquisition request of position information of each image forming apparatus existing in the range to the destination. The control unit 101-4 transmits the position information acquisition request to the position information management apparatus 105 for the image forming apparatuses through the network connection unit 101-5.

The position information management apparatus 105 receives the position information acquisition request through the network connection unit 105-4. The control unit 105-2 recognizes the information and invokes the position information search function provided by the position information management unit 105-1. The position information management unit 105-1 searches for and acquires corresponding position information from the information storage unit (memory/HD) 105-3. The control unit 105-2 recognizes the search result and acquires the position information as the search result.

After acquiring the position information as the search result, the control unit 105-2 returns the position information through the network connection unit 105-4 as a response. The control unit 101-4 recognizes the response of the position information through the network connection unit 101-5 and transmits the response of the position information as the search result to the output information generation unit 101-7.

In step S324, output information is generated by using the geographic information and position information acquired in steps S322 and S323 to output the position information of each image forming apparatus 101 together with the geographic information of each destination. With this processing, the geographic information output result contains each image forming apparatus 101, as indicated by 610 in FIG. 6 and 1010 in FIG. 10.

In step S309, the control unit 101-4 instructs the output unit 101-6 to output the output information generated in step S308 and print on a printing medium. More specifically, the control unit 101-4 transmits, to the output unit 101-6, the output information generated by the output information generation unit 101-7. The output unit 101-6 prints the received output information.

As is apparent from the above description, according to this embodiment, a destination route information output result having check fields to indicate whether the user has already visited the destination can be provided.

If an already visited destination has a check mark in the destination route information output result, route guidance excluding the visited destination is provided in re-search. As a result, the probability to give a redundant guidance can be reduced.

The user who travels need only carry paper sheets. The paper sheets are more portable than a terminal with a GPS function or car navigation system and it also does not consume batteries.

A finer service can be offered by causing the user to designate the scale in printing the map. The scale may automatically be decided depending on the paper size designated by the user.

A more useful service can be offered by printing guidance of the neighborhood of the installation site of an image forming apparatus and places of interest to each destination in addition to the map.

Other Embodiment

The present invention is applicable to a system including a plurality of devices (e.g., a host computer, interface device, reader, and printer) or an apparatus including a single device (e.g., a copying machine or facsimile apparatus).

The object of the present invention is achieved even by supplying a storage medium which records software program codes to implement the functions of the above-described embodiment to the system or apparatus. In this case, the functions are implemented by causing the computer (or CPU or MPU) of the system or apparatus to read out and execute the program codes stored in the storage medium. In this case, the storage medium which stores the program codes constitutes the present invention.

The storage medium to supply the program codes includes, e.g., a floppy® disk, hard disk, optical disk, magnetooptical disk, CD-ROM, CD-R, magnetic tape, nonvolatile memory card, and ROM.

The functions of the above-described embodiment are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-270408, filed on Sep. 16, 2005, which is hereby incorporated by reference herein in its entirety.

What is claimed is:

1. A route guidance providing system which includes at least one of image forming apparatus each connected to a server through a network and provides information about a route to a user of the image forming apparatus, comprising:

a first printing unit configured to print a report representing a route for arriving at a destination specified by destination information input by the user;

a scanning unit configured to scan the report which is printed by said first printing unit and in which the destination information input by the user is described;

an acquisition unit configured to acquire additional destination information about a destination which is newly input by the user; and a second printing unit configured to print a report representing a route for arriving at an additional destination specified by the additional destination information acquired by said acquisition unit, wherein the report represents the route for arriving at the additional destination without passing the destination which is specified by the destination information described in the report scanned by said scanning unit.

2. The system according to claim 1, wherein said second printing unit prints installation locations of the remaining image forming apparatuses in addition to the route.

3. The system according to claim 1, wherein said first printing unit also prints a field to describe information representing whether the user has already traveled.

4. An image forming apparatus comprising:
   a first printing unit configured to print a report representing a route for arriving at a destination specified by destination information input by a user;
   a scanning unit configured to scan the report which is printed by said first printing unit and in which the destination information input by the user is described;
   an acquisition unit configured to acquire additional destination information about a destination which is newly input by the user; and
   a second printing unit configured to print a report representing a route for arriving at an additional destination specified by the additional destination information acquired by said acquisition unit, wherein the report represents the route for arriving at the additional destination without passing the destination which is specified by the destination information described in the report scanned by the scanning unit.

5. An image forming method of an image forming apparatus, comprising:
   a first printing step of printing a report representing a route for arriving at a destination specified by destination information input by a user;
   a scanning step of scanning the report which is printed in said first printing step and in which the destination information input by the user is described;
   an acquisition step of acquiring additional destination information about a destination which is newly input by the user; and
   a second printing step of printing a report representing a route for arriving at an additional destination specified by the additional destination information acquired in said acquisition step, wherein the report represents the route for arriving at the additional destination without passing the destination which is specified by the destination information described in the report scanned in said scanning step.

6. A storage medium which stores a control program to cause a computer to implement an image forming method of claim 5.

\* \* \* \* \*